US008463703B1

(12) United States Patent
Bloomquist et al.

(10) Patent No.: US 8,463,703 B1
(45) Date of Patent: Jun. 11, 2013

(54) METHODS AND SYSTEMS FOR CUSTOMER INCENTIVE AWARDS

(75) Inventors: Eric William Bloomquist, Richmond Heights, MO (US); Brian Dennis Brown, O'Fallon, MO (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 13/402,076

(22) Filed: Feb. 22, 2012

(51) Int. Cl.
*G06Q 40/00* (2006.01)

(52) U.S. Cl.
USPC ............................................. 705/39

(58) Field of Classification Search
None
See application file for complete search history.

(56) References Cited

U.S. PATENT DOCUMENTS

| | | | |
|---|---|---|---|
| 5,673,402 A | 9/1997 | Ryan et al. | |
| 5,689,649 A | 11/1997 | Altman et al. | |
| 6,009,415 A * | 12/1999 | Shurling et al. | 705/35 |
| 6,269,347 B1 | 7/2001 | Berger | |
| 6,345,262 B1 | 2/2002 | Madden | |
| 6,532,450 B1 | 3/2003 | Brown et al. | |
| 6,904,414 B2 | 6/2005 | Madden | |
| 7,254,556 B2 | 8/2007 | Fry | |
| 7,512,559 B1 | 3/2009 | Snyder | |
| 7,590,581 B1 | 9/2009 | Payne et al. | |
| 7,599,886 B1 | 10/2009 | Lambert | |
| 7,627,509 B2 | 12/2009 | George | |
| 7,707,104 B2 | 4/2010 | Kalotay et al. | |
| 7,720,752 B2 | 5/2010 | Uhlmann et al. | |
| 7,809,633 B2 | 10/2010 | Nolan et al. | |
| 7,870,046 B2 | 1/2011 | Gupta | |
| 7,925,580 B2 | 4/2011 | Brasch | |
| 7,987,124 B1 | 7/2011 | Holden et al. | |
| 7,996,313 B1 | 8/2011 | Mcmurray et al. | |
| 2003/0028478 A1 | 2/2003 | Kinney et al. | |
| 2005/0108028 A1 | 5/2005 | Arehart | |
| 2005/0177508 A1 | 8/2005 | Pembroke | |
| 2006/0074794 A1 | 4/2006 | Nexpola | |
| 2006/0074795 A1 | 4/2006 | Mahara | |
| 2006/0080246 A1 | 4/2006 | Wyckoff | |
| 2006/0149663 A1 | 7/2006 | Nichols | |
| 2006/0271458 A1 | 11/2006 | Arnold et al. | |
| 2007/0100743 A1 | 5/2007 | Barge et al. | |

(Continued)

FOREIGN PATENT DOCUMENTS

| | | |
|---|---|---|
| WO | WO03098495 A1 | 11/2003 |
| WO | WO2007068863 A2 | 6/2007 |
| WO | WO2008150243 A2 | 12/2008 |

OTHER PUBLICATIONS

International Search Report and Written Opinion dated Jan. 3, 2013 for counterpart International Patent Application No. PCT/US12/67255, pp. 1-8.

*Primary Examiner* — Olabode Akintola
(74) *Attorney, Agent, or Firm* — John M. Harrington, Esq.; Johnson, Marcou & Isaacs, LLC (57) ABSTRACT

Methods and systems for generating customer incentive awards involve receiving, using a processor coupled to memory, information regarding a balance of a deposit account, such as a savings account, of at least one customer for determination of an award amount related to a loan account of the customer. Using the processor, the award amount may be computed based on at least in part on the balance of the deposit account and at least in part on an interest rate of the loan account of the customer. Thereafter, likewise using the processor, the award amount may be applied to an account designated by the customer, such as a mortgage loan account of the customer.

24 Claims, 4 Drawing Sheets

| Loan Amount | Max Offset | Offset Reward | N/C P&I @4.5% |
|---|---|---|---|
| $500,000 | $50,000 | $188 | $2,533 |
| $550,000 | $55,000 | $206 | $2,787 |
| $600,000 | $60,000 | $225 | $3,040 |
| $650,000 | $65,000 | $244 | $3,293 |
| $700,000 | $70,000 | $263 | $3,547 |
| $750,000 | $75,000 | $281 | $3,800 |
| $800,000 | $80,000 | $300 | $4,053 |
| $850,000 | $85,000 | $319 | $4,307 |
| $900,000 | $90,000 | $338 | $4,560 |
| $950,000 | $85,000 | $356 | $4,814 |
| $1,000,000 | $100,000 | $375 | $5,067 |
| $1,050,000 | $105,000 | $394 | $5,320 |
| $1,100,000 | $110,000 | $413 | $5,574 |
| $1,150,000 | $105,000 | $431 | $5,827 |
| $1,200,000 | $120,000 | $450 | $6,080 |
| $1,250,000 | $125,000 | $469 | $6,334 |

U.S. PATENT DOCUMENTS

| | | |
|---|---|---|
| 2007/0106603 A1 | 5/2007 | Whyte |
| 2007/0118451 A1 | 5/2007 | Schneider |
| 2007/0244780 A1 | 10/2007 | Liu |
| 2007/0288335 A1 | 12/2007 | Kelly |
| 2007/0288357 A1 | 12/2007 | Holman et al. |
| 2008/0033766 A1 | 2/2008 | Troxler |
| 2008/0109347 A1 | 5/2008 | Pilcher et al. |
| 2008/0114673 A1 | 5/2008 | Targett et al. |
| 2008/0172345 A1 | 7/2008 | Blair |
| 2008/0183615 A1 | 7/2008 | Rio et al. |
| 2008/0208689 A1 | 8/2008 | Johnson et al. |
| 2008/0249907 A1 | 10/2008 | Sadejyan et al. |
| 2008/0313094 A1 | 12/2008 | Wright |
| 2009/0094156 A1 | 4/2009 | Wright et al. |
| 2009/0125437 A1 | 5/2009 | Danpour et al. |
| 2009/0150282 A1 | 6/2009 | Weiss |
| 2009/0157534 A1 | 6/2009 | Arsiwala |
| 2009/0228306 A1 | 9/2009 | Izyayey et al. |
| 2009/0228320 A1 | 9/2009 | Lopez et al. |
| 2010/0121700 A1 | 5/2010 | Wigder et al. |
| 2010/0153138 A1 | 6/2010 | Evans |
| 2010/0185563 A1 | 7/2010 | Wyckoff |
| 2010/0293091 A1 | 11/2010 | Kurczodyna |
| 2010/0299244 A1 | 11/2010 | Williams, III |
| 2011/0035314 A1 | 2/2011 | Bolger |
| 2011/0047070 A1 | 2/2011 | Farias |
| 2011/0137716 A1 | 6/2011 | Reuthe et al. |
| 2011/0145118 A1 | 6/2011 | Philp et al. |
| 2011/0166989 A1 | 7/2011 | Ross et al. |
| 2011/0166994 A1 | 7/2011 | Ross et al. |
| 2011/0178920 A1 | 7/2011 | Ghosh et al. |
| 2011/0213684 A1 | 9/2011 | Tait |
| 2011/0213698 A1 | 9/2011 | Celino |

* cited by examiner

| Loan Amount | Max Offset | Offset Reward | N/C P&I @4.5% |
|---|---|---|---|
| $500,000 | $50,000 | $188 | $2,533 |
| $550,000 | $55,000 | $206 | $2,787 |
| $600,000 | $60,000 | $225 | $3,040 |
| $650,000 | $65,000 | $244 | $3,293 |
| $700,000 | $70,000 | $263 | $3,547 |
| $750,000 | $75,000 | $281 | $3,800 |
| $800,000 | $80,000 | $300 | $4,053 |
| $850,000 | $85,000 | $319 | $4,307 |
| $900,000 | $90,000 | $338 | $4,560 |
| $950,000 | $85,000 | $356 | $4,814 |
| $1,000,000 | $100,000 | $375 | $5,067 |
| $1,050,000 | $105,000 | $394 | $5,320 |
| $1,100,000 | $110,000 | $413 | $5,574 |
| $1,150,000 | $105,000 | $431 | $5,827 |
| $1,200,000 | $120,000 | $450 | $6,080 |
| $1,250,000 | $125,000 | $469 | $6,334 |

METHODS AND SYSTEMS FOR CUSTOMER INCENTIVE AWARDS

FIELD OF THE INVENTION

The present invention relates generally to the field of mortgage-related customer incentive awards, and more particularly to methods and systems for generating mortgage-related customer incentive awards.

BACKGROUND OF THE INVENTION

Up until recently, home values in the United States typically appreciated year after year. However, since the arrival of the financial crisis in 2007, homeowner's have experienced a reversal of that trend with home values decreasing instead of increasing. This has made it difficult, if not impossible, for many homeowners to get out of debt. For example, many homeowners who obtained higher loan-to-value (LTV) mortgage loans on their homes may now owe more on their mortgages than their homes are worth. These homeowners may likely have difficulty making payments and thus may be having a very difficult time getting out of debt.

Further, a tremendous amount of deleveraging is presently occurring with consumer business clients endeavoring to pay off their credit card debt and home loans in order to become debt free, for example, before retirement. Home ownership is still a dream for many people in the United States, and a financial institution may take great pride in getting its clients into home loans. Unfortunately, however, the level of home ownership in the United States has recently been as low as 66 percent. There is a present need for a mortgage-related method and system designed to help a financial institution's clients with their financial goals in the current economic environment.

SUMMARY OF THE INVENTION

Embodiments of the invention employ computer hardware and software, including, without limitation, one or more processors coupled to memory and non-transitory computer-readable storage media with one or more executable programs stored thereon which instruct the processors to perform the methods and systems for generating customer incentives described herein. It is to be understood that the term "processor" as used herein, either standing alone or in combination, refers to a computer processor.

In an aspect, embodiments of the invention propose methods and systems for generating customer incentives that may involve, for example, receiving, using a processor, information regarding a balance of a deposit account of at least one customer for determination of an award amount related to a loan account of the customer. Using the processor, the award amount may be computed based at least in part on the balance of the deposit account and at least in part on an interest rate of the loan account of the customer. Thereafter, likewise using the processor, the award amount may be applied to an account designated by the customer.

In another aspect, receiving the information regarding the balance of the deposit account may involve receiving information regarding the balance of a deposit account of the customer having no restrictions on withdrawals from the deposit account. Receiving the information regarding the balance of the deposit account may also involve receiving information regarding the balance of a savings account of the customer. Further, receiving the information regarding the balance of the savings account may involve receiving the information regarding the balance of a financial institution day-to-day savings account of the customer.

In an additional aspect, receiving the information regarding the balance of the deposit account may involve receiving information regarding the balance of the deposit account of the customer that is equal to or greater than a pre-determined percentage of a balance of the loan account of the customer. Receiving the information regarding the balance of the deposit account that is equal to or greater than the pre-determined percentage of the balance of the loan account may also involve receiving the information regarding the balance of the deposit account of the customer that is equal to or greater than the pre-determined percentage of an original balance of the loan account of the customer.

In further aspects, receiving the information regarding the balance of the deposit account may involve receiving the information regarding an average monthly balance of the deposit account of the customer on a monthly basis. In still further aspects, receiving the information for determination of the award amount related to the loan account may involve receiving the information for determination of an award amount related to a mortgage loan account of the customer.

In other aspects of embodiments of the invention, computing the award amount based at least in part on the balance of the deposit account may involve computing the award amount based at least in part on an average monthly balance of the deposit account of the customer. In further aspects, computing the award amount based at least in part on the interest rate of the loan account may involve computing the award amount based at least in part on the interest rate of a mortgage loan account of the customer. Computing the award amount based at least in part on the balance of the deposit account may also involve computing the award amount based at least in part on the balance of the deposit account of the customer that is equal to or less than a pre-determined percentage of a balance of the loan account of the customer.

In still other aspects, computing the award amount may involve computing the award amount as an amount equal to one-twelfth of a product of the balance of the deposit account of the customer multiplied by the interest rate of the loan account of the customer. Computing the award amount may also involve computing the award amount as an amount equal to one-twelfth of a product of the balance of the deposit account multiplied by a current interest rate of the loan account of the customer.

In additional aspects of embodiments of the invention, applying the award amount to the account designated by the customer may involve applying the award amount to an outstanding principal balance of the loan account of the customer. Applying the award amount to the outstanding principal balance of the loan account may also involve applying the award amount to the current outstanding principal balance of a mortgage loan account of the customer. Additionally, applying the award amount to the current outstanding principal balance of the mortgage loan account may involve applying the award amount to the current outstanding principal balance of a fixed rate mortgage loan account of the customer.

In further aspects, applying the award amount to the current outstanding principal balance of the mortgage loan account of the customer may involve applying the award amount to the current outstanding principal balance of an adjustable rate mortgage loan account of the customer. Applying the award amount to the current outstanding principal balance of the mortgage loan account of the customer may also involve applying the award amount to the outstanding principal balance of an amortizing loan account of the customer without affecting periodic payments of principal and interest due under an amortization of an original amount of the amortizing mortgage loan. In addition, applying the award amount to the outstanding principal balance of the amortizing loan account may involve applying the award amount to the outstanding principal balance of the amortizing mortgage loan account of the customer without affecting periodic monthly installments of principal and interest due under the amortization of the original amount of the mortgage loan account until fully paid.

In still further aspects, applying the award amount to the account designated by the customer may involve applying the award amount as a principal curtailment of a mortgage loan account balance of the customer. Applying the award amount to the account designated by the customer may also involve applying the award amount to a mortgage savings account of the customer towards a future purchase of a home. Applying the award amount to the account designated by the customer may additionally involve applying the award amount to an education savings account plan of the customer. Further, applying the award amount to the account designated by the customer may involve applying the award amount to a charge card savings account of the customer towards paying off an existing charge card bill. Still further, applying the award amount to the account designated by the customer may involve applying the award amount to retirement savings account of the customer.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

An objective of a financial institution may be to assist its customers in achieving their overall financial goals in finding solutions not only to become homeowners but also to pay off their home loans and save a little money, and at the same time to reward them for their overall relationship with the financial institution. The methods and systems for embodiments of the invention offer a number of solutions to help the customers of the financial institution achieve their goals.

An aspect of embodiments of the invention may enable a customer to pay less interest on the customer's home loan over time if the customer keeps money on deposit in a financial institution savings account. In another aspect, embodiments of the invention may allow the customer to build equity and pay off the customer's home loan at a faster rate by minimizing the interest expense over time. A further aspect of embodiments of the invention may provide a way for the customer to earn a higher rate of return in the current environment of exceptionally low interest rate returns.

Embodiments of the invention may provide a reward for customers having their overall financial relationship with the financial institution, being fiscally responsible, and having money in a savings account which is fully liquid. Such embodiments not only help customers of the financial institution obtain home loans and achieve their own goals and objectives, but also show customers a way to save and have reserve and emergency funds and to let their money work harder for them to pay off their home loans in a shorter time if they so choose.

An aspect of embodiments of the invention may involve providing a customer with a fixed rate mortgage loan or an adjustable rate mortgage loan. The fixed rate mortgage loan may include, for example, the customer's choice of a 30-year fixed rate mortgage loan or a 15-year fixed rate mortgage loan. The adjustable rate mortgage loan may include, for example the customer's choice of a 5/1 London Interbank Offered Rate (LIBOR) indexed adjustable rate mortgage (ARM) loan or a 10/1 LIBOR indexed ARM. Such LIBOR ARM rates may be fixed for five or ten years respectively and then adjust based on the one-year LIBOR. It is to be understood that the foregoing mortgage loan rates and terms are examples only and that embodiments of the invention may include any and all other mortgage loan rates and terms.

A key aspect of embodiments of the invention may involve, for example, having the customer maintain a financial institution savings account, which may be referred to as a day-to-day savings account. In embodiments of the invention, the financial institution day-to-day savings account may be designated as an offset account by which the customer may earn a reward. For example, the customer may place up to a predetermined percentage, such as ten percent of the principal or balance of the customer's mortgage loan in the customer's financial institution day-to-day savings account on which a monthly reward may be calculated for the customer.

Figure 1:
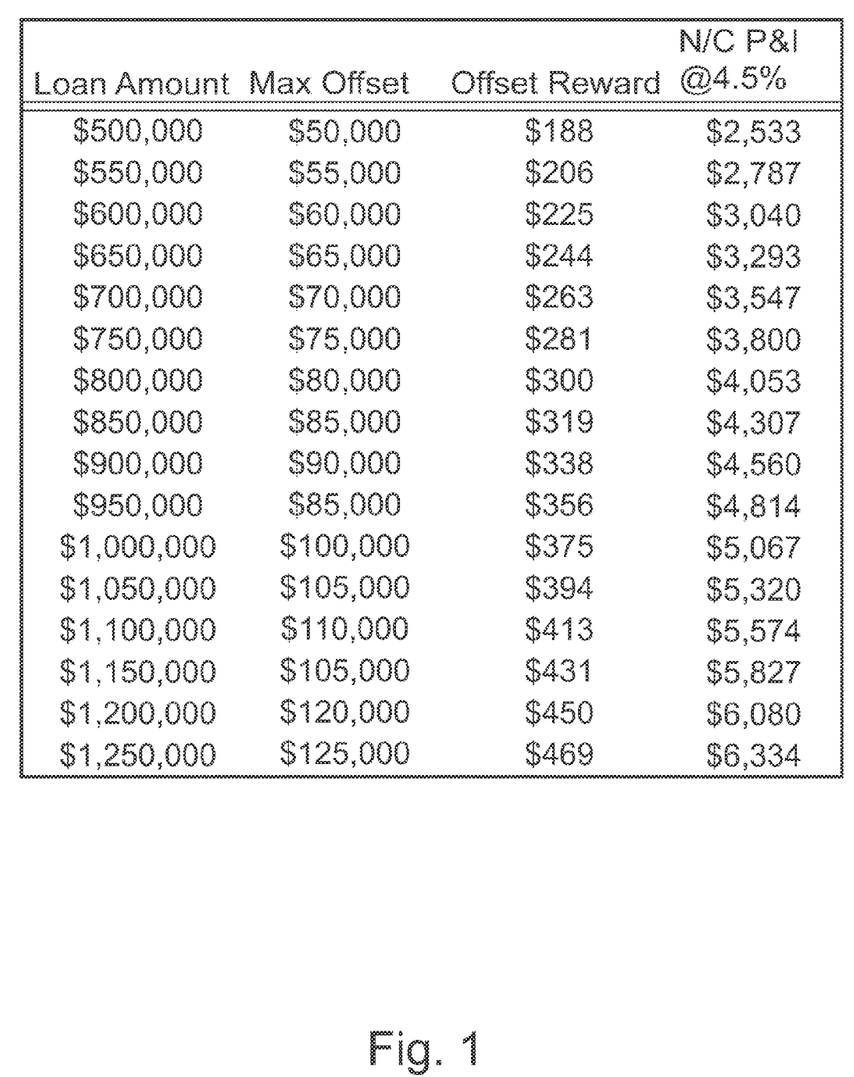
FIG. 1 is a table that illustrates examples of offset reward amounts based on a 10 percent offset on various mortgage loan amounts amortized at a fixed interest rate of 4½ percent for a term of 30 years for embodiments of the invention.

FIG. 1 is a table that illustrates examples of offset reward amounts based on a 10 percent offset on various mortgage loan amounts amortized at a fixed interest rate of 4½ percent for a term of 30 years for embodiments of the invention. Referring to FIG. 1, assume for example that a customer has a mortgage loan amount of $500,000. In this particular example, the customer may any amount on deposit in his or her day-to-day savings account, of which up to 10 percent of the $500,000 mortgage loan balance, or $50,000 of the customer's financial institution day-to-day savings account may qualify for the offset reward. Computer logic of embodiments of the invention may be used to determine an average monthly balance of the customer's financial institution day-to-day savings account each month and to calculate an offset reward. Likewise using computer logic of embodiments of the invention, that average monthly balance amount of up to 10 percent of the mortgage loan balance in the example may be used to compute a reward amount for the customer.

Thus, if the current interest rate on the customer's home loan mortgage in the foregoing example is 4½ percent, and if the customer chooses to maximize the customer's savings balance, the customer may earn a reward of $188.00 in the first month of the customer's mortgage loan term. In embodiments of the invention, the customer's monthly payments of $2,533 are not reduced but instead the customer must continue to make the customer's principal and interest payments according to the same amortization in which the loan was originated and made.

For example, the customer may sign a contractual agreement to repay the $500,000 which the financial institution loans to the customer. Thus, the customer is contractually obligated to repay the $500,000 loan, for example, in monthly installments of principal and interest of $2,533.00 each and every month for the full term of the loan, such as 30 years or 360 months. According to embodiments of the invention, the customer remains obligated to continue to make that same monthly payment. However, in embodiments of the invention, while the customer is repaying those same monthly payments, if the customer also has money in a financial institution savings account, the customer may earn the offset reward.

Figure 2:
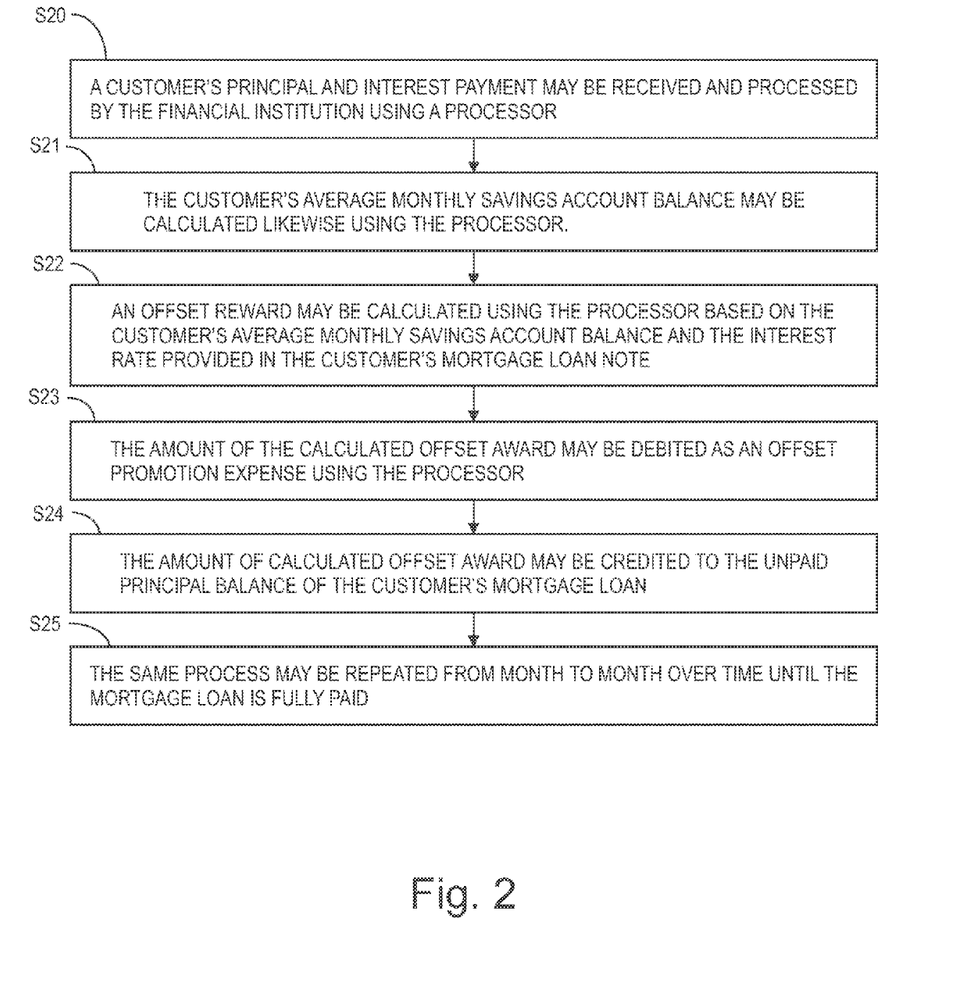
FIG. 2 is a flow chart that illustrates an example of the process of computing an offset award amount for embodiments of the invention.

FIG. 2 is a flow chart that illustrates an example of the process of computing an offset award amount for embodiments of the invention. In the foregoing example of a 30-year 4½ percent fixed-rate mortgage loan of $500,000, the customer may make a principal and interest payment of $2,533.00 to the financial institution in the first month. Referring to FIG. 2, at S20, the principal and interest payment may be received and processed by the financial institution using computer logic. In a separate transaction, at S21, the customer's average monthly savings account balance may be calculated likewise using computer logic. Thus, using computer logic, the customer's average monthly savings account balance may be calculated and, at S22, based on the interest rate provided in the customer's mortgage loan note, an offset reward may likewise be calculated, which is $188 in the foregoing example.

Thereafter, at S23, an offset promotion expense may be debited at the financial institution's mortgage business, and at S24, the financial institution may credit the customer with $188.00 to be applied to the unpaid principal balance of the customer's mortgage loan. As a result, the customer's mortgage loan balance may be decreased by an amount that is greater than the amount of decrease shown on the standard amortization schedule for the customer's loan. At S25, the same process may be repeated from month to month, and as the process continues from month to month over time, the customer may experience a savings in the amount of interest paid on the customer's mortgage loan and a corresponding build-up of equity at an increasingly faster rate.

In embodiments of the invention, the customer may earn a higher effective rate of return on the customer's savings, while at the same time minimizing interest expense and building equity. At today's market rates of interest on a per annum basis, money market savings may pay thirty basis points, a one-year certificate of deposit may pay one percent, and a ten-year treasury may pay around two percent. In contrast to those current low rates of interest which a customer may earn, the method and system for embodiments of the invention may enable a customer to effectively earn the same rate of interest as their mortgage loan note rate of interest, such as 4½ percent. Moreover, interest rates on deposit accounts are always lower than mortgage interest rates.

It is to be noted that in embodiments of the invention, the customer's savings account may be liquid. Thus, if the customer has an emergency and needs to use those funds for some purpose, it is not pledged or otherwise locked up in any way. The customer may have the right to withdraw those funds on a daily basis whenever the customer has a need to do so. The only result of such withdrawal is that the offset may be reduced in proportion to the amount withdrawn.

For many customers, not only is getting out of debt a particular problem in the current economic environment, but it may also be problematic for such customers to find a way to maximize their rate relationship with financial institutions. Aspects of the invention may offer solutions to those problems by helping customers to obtain mortgage financing, adding value to the overall relationship between the customer and the financial institution with rewards and benefits such as the offset mortgage rewards, and helping customers to pay off their mortgage loans more quickly, while minimizing their interest expense.

The mortgage product for embodiments of the invention may be referred to as an offset mortgage because of the calculations previously explained by which a customer may pay interest only on the net account of the outstanding mortgage balance less the qualified savings account balance. Thus, the $500,000 mortgage loan amount may in effect be offset by the $50,000 savings balance, and the result is as if the customer pays interest on only $450,000 of the mortgage loan.

Aspects of embodiments of the invention may involve a multi-part process. In a first process part, a loan may be originated in a manner similar to other loan originations. Another part of the process may involve a transaction, for example, by a business unit of the financial institution responsible for savings accounts. Still another part of the process may involve a transaction by a business unit of the financial institution responsible for mortgage loans.

Figure 3:
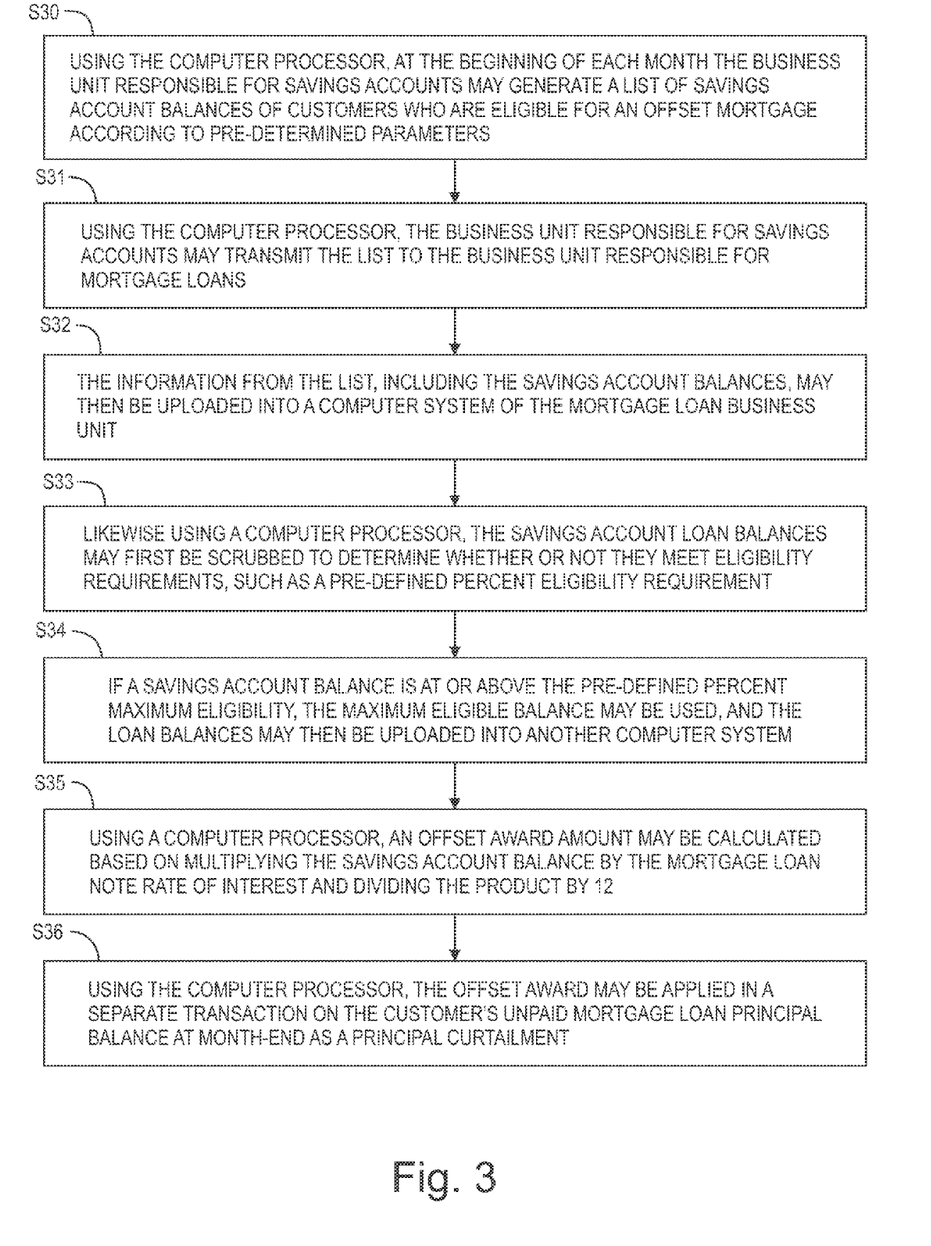
FIG. 3 is a flow chart that illustrates another example of the process of computing an offset award amount for embodiments of the invention.

FIG. 3 is a flow chart that illustrates another example of the process of computing an offset award amount for embodiments of the invention. For example, at S30, using a computer processor, at the beginning of each month the business unit responsible for savings accounts may generate a list of savings account balances of customers who are eligible for an offset mortgage according to pre-determined parameters. At S31, the business unit responsible for savings accounts may transmit the list to the business unit responsible for mortgage loans.

Referring further to FIG. 3, at S32, the information from the list, including the savings account balances, may then be uploaded into a computer system of the mortgage loan business unit. Thereafter, at S33, likewise using a computer processor, the savings account loan balances may first be scrubbed to determine whether or not they meet eligibility requirements, such as a ten percent eligibility requirement. If a savings account balance is at or above the ten percent maximum eligibility, the maximum eligible balance may be used. If, for example, the ten percent eligibility requirement is met or exceeded, at S34, the loan balances may then be uploaded into another computer system.

Referring again to FIG. 3, at S35, using a computer processor, an award amount may be calculated based, for example, on variables. One such variable may be an interest rate on the customer's mortgage loan note at the end of the month. Another such variable may be the customer's savings account balance. Using the processor, an offset award amount may be calculated based, for example, on multiplying the savings account balance by the mortgage loan note rate of interest and dividing the product by 12. At S36, the offset award may then be applied in a separate transaction on the customer's unpaid mortgage loan principal balance at month-end as a principal curtailment.

In embodiments of the invention, the principal curtailment amount may be kept and recorded separately from other transactions, so that an exact amount of the offset award may be calculated at the end of the year. It is to be noted that the total offset award for a year may be considered interest income to the customer for which the customer may receive a 1099INT form.

Once a curtailment is made, the system for embodiments of the invention may be annotated with the mechanics of computing the award and supporting data. Accordingly, in the event the customer makes an inquiry about the customer's offset award and the manner in which it was calculated, the information is readily accessible. In addition, the balances used in calculating the customer's offset award may be matched and reconciled to the balances received by the customer, for example, on the customer's most recent monthly statement for the customer's savings account.

As previously noted, in embodiments of the invention, the offset amount is an award that may be applied against the outstanding principal balance of the mortgage loan. The customer must continue to make the customer's normal monthly amortized mortgage loan payment amount as agreed in the mortgage loan documents, and the offset award may help the customer to pay off the mortgage earlier.

As also previously noted, the customer's mortgage may be, for example, an ARM loan which has an interest rate that may remain the same for a number of years, such as five or ten years, after which the interest rate may be adjusted each year. Typically, the monthly payments of principal and interest on the outstanding balance of such a mortgage may be computed on the basis of a 30-year amortization. While 15 and 30 year fixed rate mortgages and five and ten-year ARM mortgages have been discussed herein, embodiments of the invention are not limited to such loan terms but may include all types of mortgage loan terms that amortize, such as a seven-year ARM or a two-year fixed rate mortgage.

Figure 4:
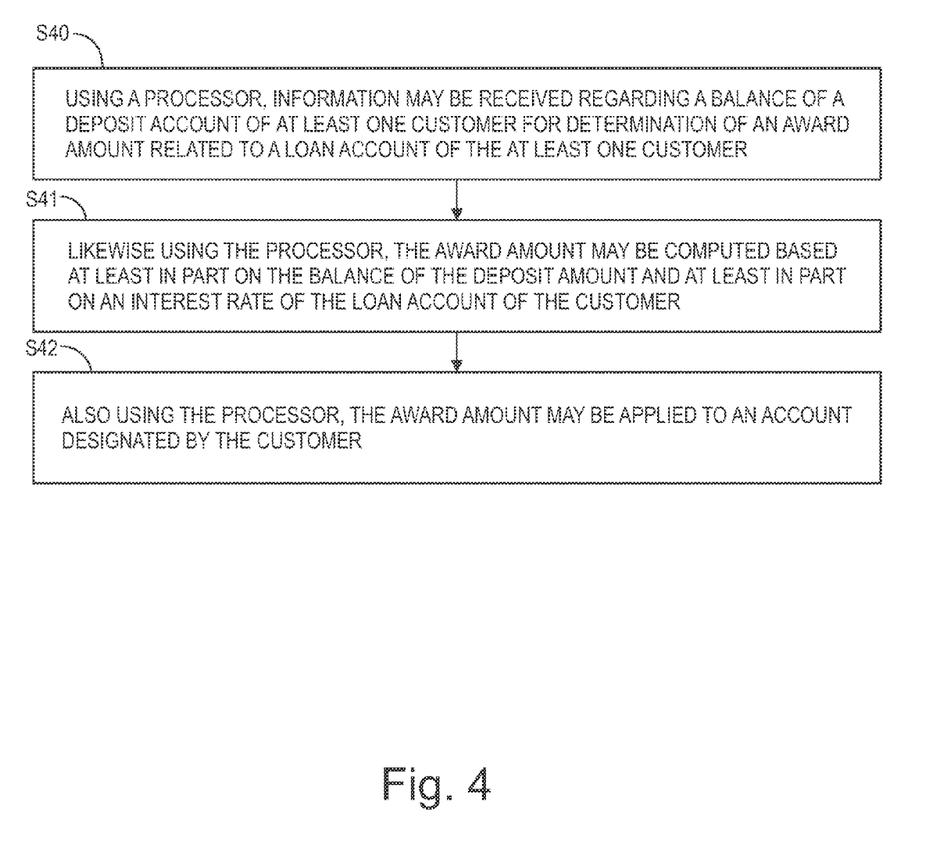
FIG. 4 is a flow chart that illustrates a further example of the process of computing an offset award amount for embodiments of the invention.

FIG. 4 is a flow chart that illustrates a further example of the process of computing an offset award amount for embodiments of the invention. Referring to FIG. 4, at S40, using a processor, information may be received regarding a balance of a deposit account of at least one customer for determination of an award amount related to a loan account of the customer. At S41, likewise using the processor, the award amount may be computed based on at least in part on the balance of the deposit account and at least in part on an interest rate of the loan account of the customer. At S 42, also using the processor, the award amount may be applied to an account designated by the customer.

It is to be noted that the offset award for embodiments of the invention are not limited to mortgage loan balance curtailment. For example, in addition to the mortgage loan balance curtailment aspect for embodiments of the invention, a mortgage savings account aspect of the invention may employ the offset award process to allow a customer to earn rewards towards a future purchase of a home. Additionally, an education savings account aspect of embodiments of the invention may employ the offset award, for example, toward an education savings plan, such as a 529-education plan. Further, a credit card savings account aspect of embodiments of the invention may employ the offset award towards paying off a customer's credit card bill.

In the financial institution's overall objective of helping customers achieve their financial goals, embodiments of the invention may provide help for customers in getting out of debt and minimizing interest expense. Other aspects of embodiments of the invention may involve, for example, helping customers to save for retirement by enabling them to free up amounts of cash flow, for example, to maximize their IRA contribution for the year and/or enabling them to save for educational purposes in a 529 plan.

Each of those aspects of embodiments of the invention may involve, for example, an offset award. Thus, in aspects of the invention, the customer may be given an option to have the offset award applied against the customer's home mortgage loan to pay the loan down and minimize interest expense. In other aspects, the customer may be given an option to have the offset award deposited, for example, in a financial institution investment account towards retirement, such as a self-directed IRA. Thus, embodiments of the invention may offer customers help in achieving financial goals with the offset reward which they earn.

It is to be understood that embodiments of the invention may be implemented as processes of a computer program product, each process of which is operable on one or more processors either alone on a single physical platform, such as a personal computer, or across a plurality of platforms, such as a system or network, including networks such as the Internet, an intranet, a WAN, a LAN, a cellular network, or any other suitable network. Embodiments of the invention may employ client devices that may each comprise a computer-readable medium, including but not limited to, random access memory (RAM) coupled to a processor. The processor may execute computer-executable program instructions stored in memory. Such processors may include, but are not limited to, a microprocessor, an application specific integrated circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C#, Visual Basic, Java, Python, Perl, and JavaScript.

It is to be further understood that client devices that may be employed by embodiments of the invention may also comprise a number of external or internal devices, such as a mouse, a CD-ROM, DVD, keyboard, display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices.

What is claimed is:

1. A method of generating customer incentive awards, comprising:
   receiving, using a processor, information regarding a balance of a deposit account of at least one customer for determination of an award amount related to a loan account of the at least one customer;
   computing, using the processor, the award amount based at least in part on the balance of the deposit account that is equal to or less than a pre-determined percentage of a balance of the loan account and at least in part on an interest rate of the loan account of the at least one customer; and
   applying, using the processor, the award amount to an account designated by the at least one customer.

2. The method of claim 1, wherein receiving the information regarding the balance of the deposit account further comprises receiving information regarding the balance of a deposit account of the at least one customer having no restrictions on withdrawals.

3. The method of claim 1, wherein receiving the information regarding the balance of the deposit account further comprises receiving information regarding a balance of the savings account of the at least one customer.

4. The method of claim 3, wherein receiving the information regarding the balance of the savings account further comprises receiving the information regarding the balance of a financial institution day-to-day savings account of the at least one customer.

5. The method of claim 1, wherein receiving the information regarding the balance of the deposit account further comprises receiving information regarding the balance of the deposit account of the at least one customer that is equal to or greater than a pre-determined percentage of a balance of the loan account of the at least one customer.

6. The method of claim 5, wherein receiving the information regarding the balance of the deposit that is equal to or greater than a pre-determined percentage of the balance of the loan account further comprises receiving the information regarding the balance of the deposit account of the at least one customer that is equal to or greater than the pre-determined percentage of an original balance of the loan account of the at least one customer.

7. The method of claim 1, wherein receiving the information regarding the balance of the deposit account further comprises receiving the information regarding an average monthly balance of the deposit account of the at least one customer.

8. The method of claim 1, wherein receiving the information for determination of the award amount related to a loan account of the at least one customer further comprises receiving the information for determination of an award amount related to a mortgage loan account of the at least one customer.

9. The method of claim 1, wherein computing the award amount based at least in part on the balance of the deposit account further comprises computing the award amount based at least in part on an average monthly balance of the deposit account of the at least one customer.

10. The method of claim 1, wherein computing the award amount based at least in part on the interest rate of the loan account further comprises computing the award amount based at least in part on the interest rate of a mortgage loan account of the at least one customer.

11. The method of claim 1, wherein computing the award amount further comprises computing the award amount as an amount equal to one-twelfth of a product of the balance of the deposit account of the at least one customer multiplied by the interest rate of the loan account of the at least one customer.

12. The method of claim 11, wherein computing the award amount further comprises computing the award amount as an amount equal to one-twelfth of the product of the balance of the deposit account multiplied by a current interest rate of the loan account of the at least one customer.

13. The method of claim 1, wherein applying the award amount to the account designated by the at least one customer further comprises applying the award amount to an outstanding principal balance of the loan account of the at least one customer.

14. The method of claim 13, wherein applying the award amount to the outstanding principal balance of the loan account further comprises applying the award amount to the current outstanding principal balance of a mortgage loan account of the at least one customer.

15. The method of claim 14, wherein applying the award amount to the current outstanding principal balance of the mortgage loan account further comprises applying the award amount to the current outstanding principal balance of a fixed rate mortgage loan account of the at least one customer.

16. The method of claim 14, wherein applying the award amount to the current outstanding principal balance of the mortgage loan account of the at least one customer further comprises applying the award amount to the current outstanding principal balance of an adjustable rate mortgage loan account of the at least one customer.

17. The method of claim 14, wherein applying the award amount to the current outstanding principal balance of the mortgage loan account of the at least one customer further comprises applying the award amount to the outstanding principal balance of an amortizing loan account of the at least one customer without affecting periodic payments of principal and interest due under an amortization of an original amortizing loan amount.

18. The method of claim 17, wherein applying the award amount to the outstanding principal balance of the amortizing loan account further comprises applying the award amount to the outstanding principal balance of the amortizing mortgage loan account of the at least one customer without affecting periodic monthly installments of principal and interest due under the amortization of the original mortgage loan amount until fully paid.

19. The method of claim 1, wherein applying the award amount to the account designated by the at least one customer further comprises applying the award amount as a principal curtailment of a mortgage loan account balance of the at least one customer.

20. The method of claim 1, wherein applying the award amount to the account designated by the at least one customer further comprises applying the award amount to a mortgage savings account of the at least one customer.

21. The method of claim 1, wherein applying the award amount to the account designated by the at least one customer further comprises applying the award amount to an education savings account plan of the at least one customer.

22. The method of claim 1, wherein applying the award amount to the account designated by the at least one customer further comprises applying the award amount to a charge card savings account of the at least one customer.

23. The method of claim 1, wherein applying the award amount to the account designated by the at least one customer further comprises applying the award amount to a retirement savings account of the at least one customer.

24. A machine for generating customer incentive awards, comprising:
- a processor coupled to memory, the processor configured to:
- receive information regarding a balance of a deposit account of at least one customer for determination of an award amount related to a loan account of the at least one customer;
- compute the award amount based on at least in part on the balance of the deposit account that is equal to or less than a pre-determined percentage of a balance of the loan account and at least in part on an interest rate of the loan account of the at least one customer; and
- apply the award amount to an account designated by the at least one customer.

* * * * *